United States Patent
Ghalib

(10) Patent No.: US 8,597,522 B2
(45) Date of Patent: Dec. 3, 2013

(54) WASTE WATER STORAGE AND TREATMENT SYSTEM AND METHOD

(76) Inventor: Saad A. Ghalib, Ann Arbor, MI (US)

( * ) Notice: Subject to any disclaimer, the term of this patent is extended or adjusted under 35 U.S.C. 154(b) by 0 days.

(21) Appl. No.: 13/317,229

(22) Filed: Oct. 11, 2011

(65) Prior Publication Data

US 2012/0080388 A1    Apr. 5, 2012

Related U.S. Application Data

(62) Division of application No. 12/745,961, filed as application No. PCT/US2008/085537 on Dec. 4, 2008, now Pat. No. 8,034,238.

(60) Provisional application No. 60/992,140, filed on Dec. 4, 2007.

(51) Int. Cl.
    *C02F 1/50*    (2006.01)

(52) U.S. Cl.
    USPC ............... 210/747.2; 210/747.9; 210/749; 210/764

(58) Field of Classification Search
    USPC .......... 210/747.2, 747.9, 749, 764, 170.03, 210/205, 206, 252, 257.1, 258, 532.2; 405/36, 53
    See application file for complete search history.

(56) References Cited

U.S. PATENT DOCUMENTS

| | | |
|---|---|---|
| 1,793,599 A | 2/1931 | Egan |
| 3,592,342 A | 7/1971 | Shankle |
| 4,457,646 A | 7/1984 | Laesch |
| 4,865,069 A | 9/1989 | Lacey |
| 4,892,440 A | 1/1990 | Regan |
| 5,161,911 A | 11/1992 | Regan |
| 5,252,214 A | 10/1993 | Lorenz et al. |
| 5,360,289 A | 11/1994 | Takada et al. |
| 5,433,845 A | 7/1995 | Greene et al. |
| 5,505,840 A | 4/1996 | Caldwell |
| 5,514,277 A | 5/1996 | Khudenko |
| 5,707,513 A | 1/1998 | Jowett et al. |
| 5,752,785 A | 5/1998 | Tanaka et al. |
| 5,770,059 A | 6/1998 | Rhee |
| 5,902,477 A | 5/1999 | Vena |
| 5,980,739 A | 11/1999 | Jowett et al. |
| 6,000,880 A | 12/1999 | Halus |
| 6,126,361 A | 10/2000 | Gardiner |
| 6,132,626 A | 10/2000 | Hart |
| 6,190,548 B1 | 2/2001 | Frick |
| 6,214,228 B1 | 4/2001 | Jones et al. |
| 6,315,897 B1 | 11/2001 | Maxwell |
| 6,318,395 B1 | 11/2001 | Anderson et al. |
| 6,371,690 B1 | 4/2002 | Monteith |
| 6,503,404 B2 * | 1/2003 | Ghalib .................. 210/749 |

(Continued)

FOREIGN PATENT DOCUMENTS

WO    2006130850 A1    12/2006

*Primary Examiner* — Lucas Stelling
(74) *Attorney, Agent, or Firm* — Brooks Kushman P.C.

(57) ABSTRACT

A multi-chamber basin is sized to collect excess waste water exceeding the processing capacity of a sewage system. In order to disinfect the waste water exceeding the basin capacity, disinfectant is added at a point in the system after the first basin. After the rain event is over and there is excess sewage treatment capacity, the sewage treatment in the multi-chamber basin is returned to the sewage system. By not disinfecting the waste water in the first basin chamber, the overall disinfectant usage can be minimized.

3 Claims, 3 Drawing Sheets

(56) References Cited

U.S. PATENT DOCUMENTS

| | | |
|---|---|---|
| 6,796,325 B1 | 9/2004 | Courier |
| 7,094,337 B2 | 8/2006 | Williams et al. |
| 7,258,211 B2 | 8/2007 | Yamada |
| 2001/0030161 A1 | 10/2001 | Hosoya |
| 2001/0047965 A1 | 12/2001 | Ghalib |
| 2002/0139736 A1 | 10/2002 | Stever et al. |
| 2002/0185438 A1 | 12/2002 | Johnstone |
| 2004/0040598 A1 | 3/2004 | Zimmerman, Jr. et al. |
| 2004/0045907 A1 | 3/2004 | Collings |
| 2005/0045541 A1 | 3/2005 | Williams et al. |
| 2005/0109707 A1 | 5/2005 | Bryant |
| 2006/0169648 A1 | 8/2006 | Fitzgerald |
| 2006/0237369 A1 | 10/2006 | Kirts et al. |
| 2006/0273046 A1 | 12/2006 | Ghalib |

\* cited by examiner

US 8,597,522 B2

WASTE WATER STORAGE AND TREATMENT SYSTEM AND METHOD

CROSS-REFERENCE TO RELATED APPLICATIONS

This application is a division of U.S. application Ser. No. 12/745,961 filed Jun. 3, 2010, which, in turn, is the National phase of PCT/US2008/08553, filed Dec. 4, 2008, which claims the benefit of U.S. provisional Application No. 60/992,140 filed Dec. 4, 2007, the disclosure(s) of which are incorporated in their entirety by reference herein.

BACKGROUND OF THE INVENTION

1. Field of the Invention

This invention relates to systems and methods for storing and treating excess waste water from a sewer system such as a combined storm and sanitary sewer system or a sanitary sewer system.

2. Background Art

Combined sewer systems, i.e. sewer systems that carry both sanitary sewage and storm water run off still exists in many older cities built before it was common to separate storm and sanitary sewer systems. During heavy rain storms the sewage flow through the combined storm and sanitary sewer system may exceed the treatment capacity of the sewage treatment plant. In order to avoid dumping excess untreated sewage into receiving water body, such as a river, lake or ocean, it is common to create basins to store excess combined storm and sanitary sewage. After the rain event the sewage is reintroduced into the sewage system so that it can be processed by the sewage treatment plant when there is available treatment capacity.

Basins have historically been rather expensive to construct, particularly in the areas with limited land and high land costs. Many traditional basins also require substantial pumping equipment in order to discharge sewage to a waterway in the event that the basin capacity is exceeded. In order to eliminate the health risk of discharging raw sewage into a waterway, a basin system may include a system for introducing a disinfectant into the waste stream system and for separating solids as well as floatables from any basin discharge.

SUMMARY OF THE INVENTION

An example of several state of the art basin systems designed to minimize construction costs and to disinfect and screen any basin overflow are illustrated in U.S. Pat. No. 6,503,404, U.S. Publication 2006-0273046 and International Published patent application WO 2006/130850, all previously developed by the present applicant and incorporated by reference herein. In these systems a divided vertical shaft or a pair of adjacent vertical shafts interconnected at the bottom, allow sewage flow through the basin to achieve very high contact time with the disinfectant material. Solids and floatables can be readily removed from any basin overflow, and land acquisition cost is minimized due to the low footprint of the system.

The current system and method uses a multi-chamber basin sized so that the majority of rain events which exceed the temporary processing capacity of the sewage system will not result in a basin overflow. A treating agent or disinfectant is added after the first chamber of the basin so that any basin overflow discharge will be suitably disinfected. After the rain event is over and there is available sewage treatment capacity, the sewage in the basin will be pumped back into the sewage system. In order to minimize the use of disinfectant to treat wastewater not discharged, disinfectant is added to a second chamber avoiding the need to disinfect the contents of the first chamber which is returned to the sewer system after a rain event. The reduction in disinfectant usage to treat wastewater returned to the sewer system not only reduces operating costs but improves sewer system performance and reduces the discharge of disinfectant into the environment.

DETAILED DESCRIPTION OF THE PREFERRED EMBODIMENT(S)

Figure 2:
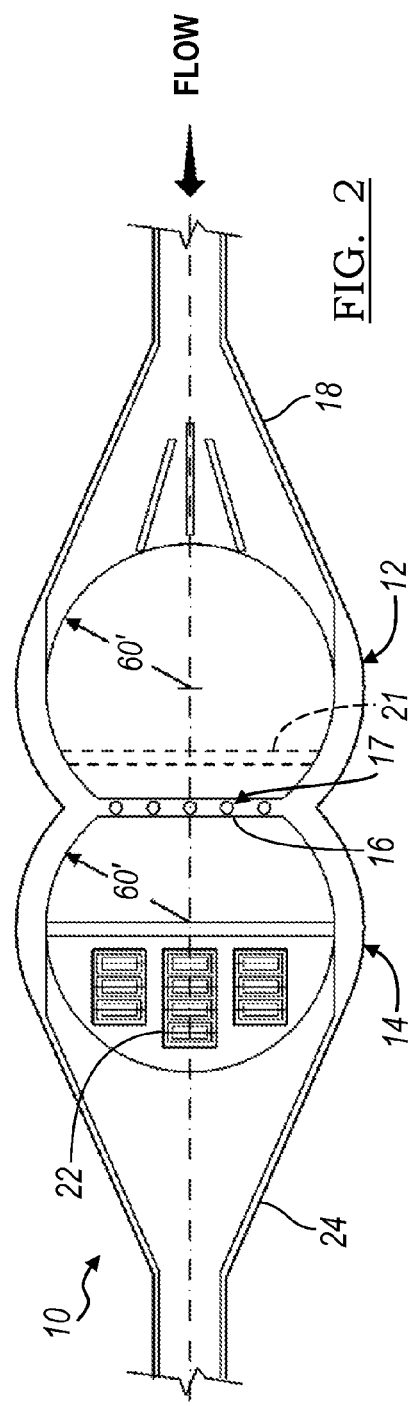
FIG. 2 is a top plan view of the treatment system of FIG. 1.
Figure 1:
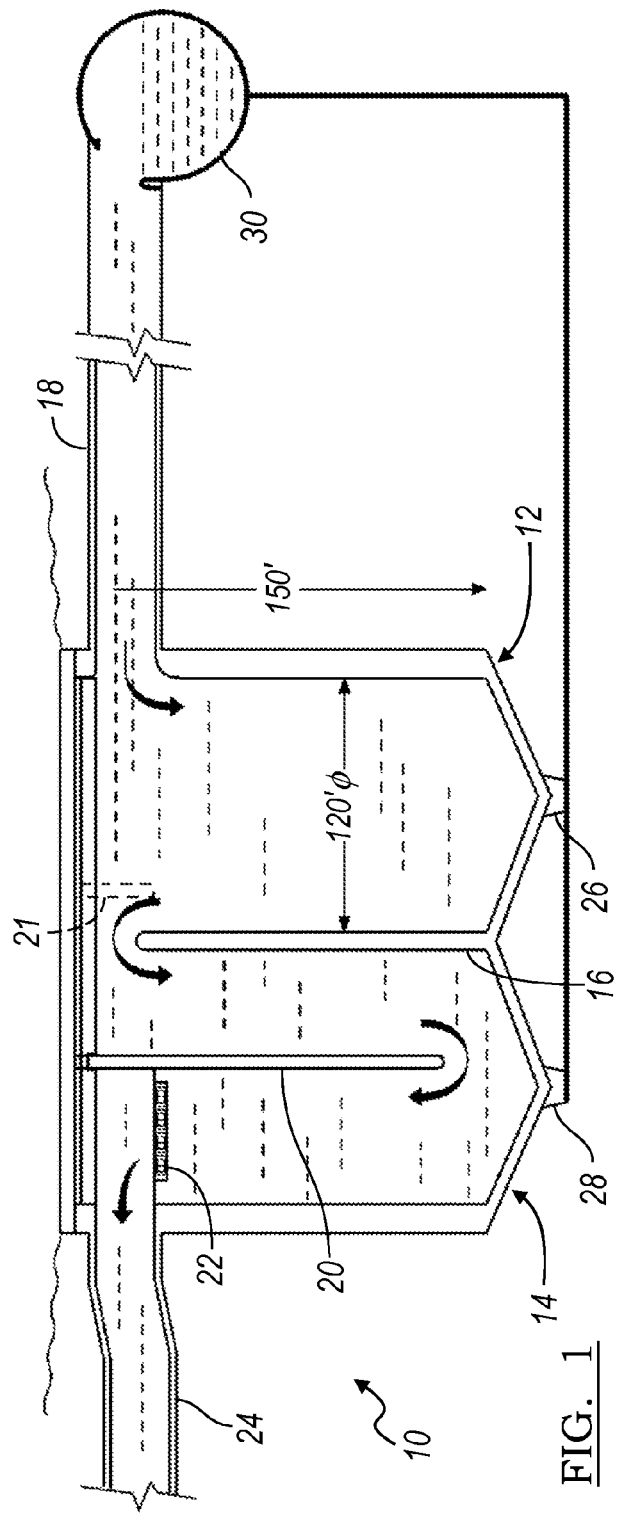
FIG. 1 is a side elevational view of the first embodiment of a waste water treatment system of the present invention.

With reference to FIGS. 1 and 2 of a first embodiment of a waste water treatment system 10 is illustrated. The treatment system is made up of two parallel shafts 12 and 14 connected together in Siamese fashion with a common separating wall 16. Excess sewage flow is introduced into the system into shaft 12 through a sewage inlet 18. Typically, the sewage in storage shaft 12 will not be treated with disinfectants or other chemicals. Once storage shaft 12 is filled, sewage untreated wastewater will spill over divider wall 16 into treatment shaft 14. Treatment shaft 14 is provided with a divider wall 20 which stops short of the shaft bottom. When sewage enters treatment shaft 14, a suitable amount of a treating agent such as a disinfectant is added proportional to the sewage volume by treating agent dispense 17. Alternative treating agents include coagulants or a combination of a coagulant and a disinfectant.

When the sewage level exceeds the capacity of treatment shaft 14, sewage passes through screen 22 and is discharged through outlet 24. The suspended divider wall 20 which bisects treatment shaft 14 into two interconnected chambers, causing sewage flowing through the treatment shaft to travel through a U-shape flow path. Sewage flows first downwardly and then upwardly on opposite sides of divider wall 20 thereby maintaining sufficient contact time with the treating agent to adequately treat (disinfect) the sewage prior to discharge through discharge outlet 24. Heavy solids will accumulate in the bottoms of storage shaft 12 and treatment shaft 14. Divider wall 20 will also prevent floatable material from being discharged through the discharge outlet 24. Screen 22 further eliminates solid materials which are not separated by floatation or settling.

In order to further limit the amount of solid material that reaches screen 22, an optional skimmer wall 21 may be installed in the top of a storage shaft 12. Skimmer wall 21 is positioned adjacent divider wall 16 and extends a relatively short distance downward into the storage shaft. Skimmer wall 21 will keep floatable solids in the storage shaft 12 significantly reducing the amount of floatable waste introduced into the treatment shaft 14 and resulting in better floatables separation, particularly at very high flow rates.

Once the rain event resulting in the excess sewage has ended and there is excess treatment capacity, the sewage contained in the system will be gradually returned to the sewer system and processed by the waste treatment plant. Sewage pumps 26 and 28 are provided at the bottoms of storage shaft 12 and treatment shaft 14 to return sewage along with any solids and floatable material collected in the shafts to the main sewer collector 30. This eliminates the need to collect solid waste from the basin sites. A rotary agitator may be installed in the bottom of the storage and treatment shafts to flush out any accumulated solids as described in applicants earlier patent publications previously incorporated by reference.

Preferably, the sewage from within storage shaft 12 is pumped out of the system first. Once storage shaft 12 is empty, then the contents of treatment shaft 14 will be returned to the sewage collector 30. In that way, in the event of a reoccurrence of an excess sewage event, such as another rain storm, combined sewer and storm water will be stored in the storage shaft 12 without need to utilize additional disinfectant until the storage in shaft 12 is once again filled. Using a storage shaft 12 in advance of the treatment shaft 14 increases system capacity and minimizes the use of disinfectants.

A waste water treatment system of the present invention can be utilized to make very large capacity systems. In a system built in the design illustrated in FIGS. 1 and 2, the system can have a capacity of over 10,000,000 gallons, preferably over 20,000,000 gallons and in the illustrated embodiment about 24,000,000 gallons. Over 80% and preferably half of the system capacity is resident in the storage shaft 12 with the remainder in treatment shaft 14. Preferably storage shaft 12 and treatment shaft 14 each have a diameter in excess of 40 feet. In the disclosed representative embodiment each shaft has a radius of about 60 feet and a nominal height of about 150 feet. When constructing a waste water treatment system of this size, the shaft walls can be formed utilizing the diaphragm wall construction method. Divider wall 16 and 20 can be installed using diaphragm wall method or subsequently cast in place using steel reinforced concrete poured into forms. The resulting system is configured to accommodate a flow rate of at least 600 cubic feet per second and preferably over 1,000 cubic feet per second with sufficient contact time with the treating agent introduced into the second container to disinfect any wastewater that reaches the effluent discharge outlet 24.

Alternatively, particularly with smaller diameter shafts, the shafts can be constructed by sinking a stacked series of steel reinforced concrete rings into the ground as is commonly done in vertical underground shaft construction. Once the shafts are in place and the shaft bottoms are finished, the treatment plant will typically be capped with a steel reinforced concrete deck which can be placed at or below surface grade.

Figure 3:
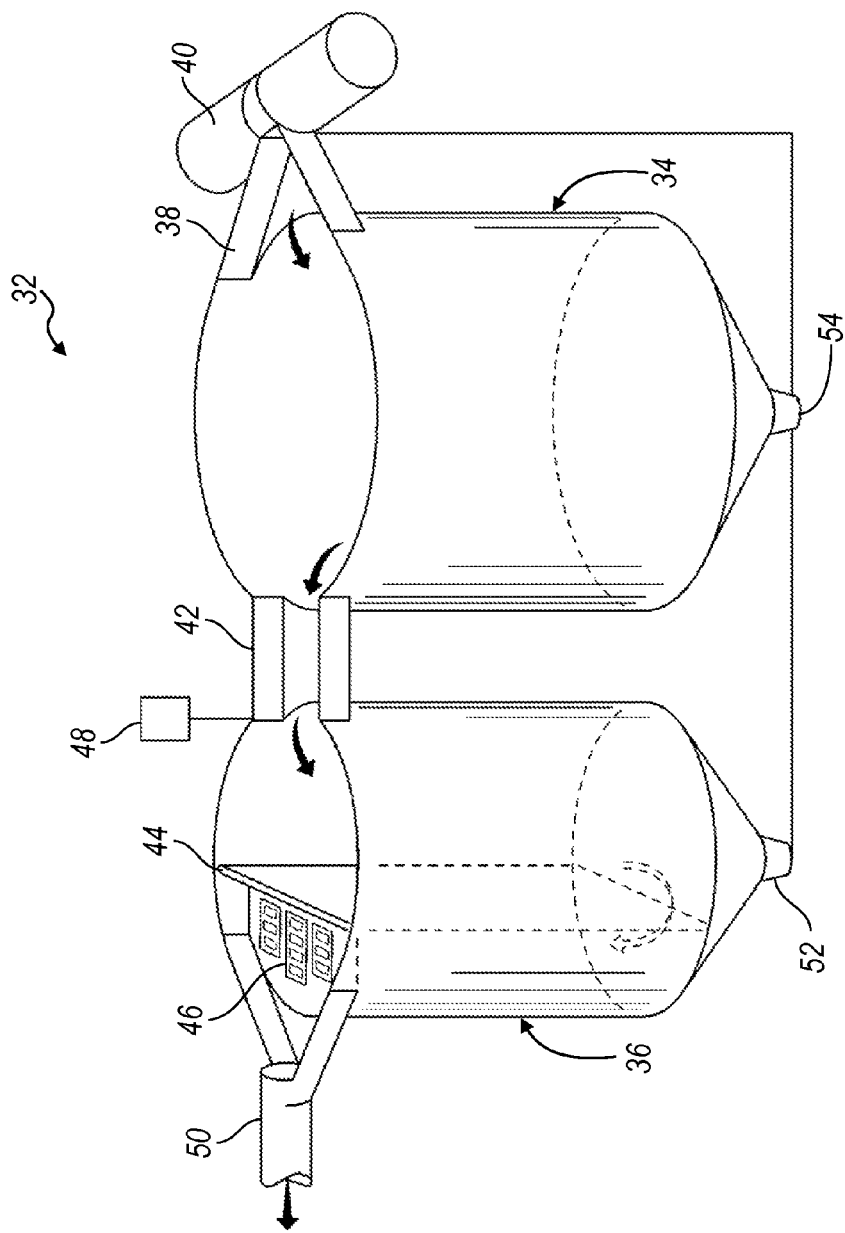
FIG. 3 is perspective view of a second waste water treatment system embodiment.

FIG. 3 illustrates a second embodiment of the invention 32 which is made up of a storage shaft 34 and a treatment shaft 36. These shafts are generally vertical and are spaced apart parallel to one another. The storage shaft 34 is provided with an inlet 38 connecting the storage shaft to an overflow for sewer collector 40. Storage shaft 34 is illustrated as a vertical cylindrical shaft, however, any other suitable storage basin shape can be utilized to practice the present invention. The conduit 42 provides an outlet for the storage shaft and an inlet to treatment shaft 36. Treatment shaft 36 is provided with a divider wall 44 which terminates short of the shaft bottom, similar to treatment shaft 14 illustrated in FIGS. 1 and 2. Screen 46 is provided in the outlet side of divider wall 44 to collect solids not otherwise separated by floatation or settling. A disinfectant dispenser of 48 is provided at the inlet to treatment shaft 36 which dispenses a disinfectant chemical in measured proportion to the flow of sewage entering the treatment shaft. The treatment shaft is provided with an outlet 50 so that overflow from the treatment system which has been disinfected and screened can be safely discharged.

The water treatment system of the second embodiment is provided with sewage pumps 52 and 54 which return collected sewage to the sewer collector 40 once the excess water event has ended and there is sufficient capacity at the treatment plant to process additional sewage.

Figure 4:
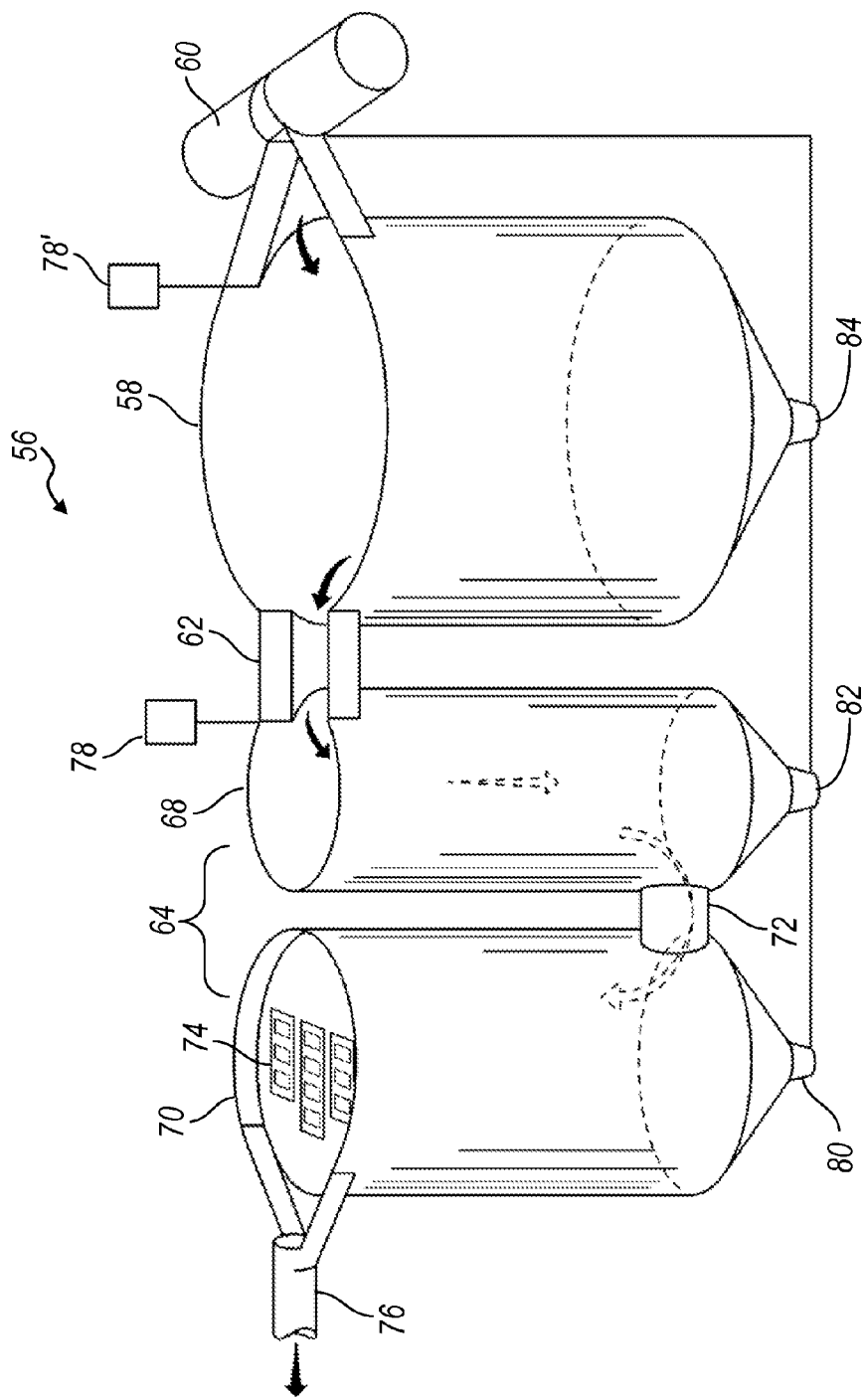
FIG. 4 is a perspective view of a third waste water treatment system embodiment.

FIG. 4 illustrates a third embodiment of the waste water treatment system 56. This waste water treatment system 56 has a storage basin 58 for storing untreated sewage. Storage basin 58 is connected to an overflow from sewage system collector 60. Once the storage basin is full, sewage exits the storage basin via conduit 62 and enters the dual shaft treatment system 64. Dual shaft treatment system 64 is made up of a pair of shafts 68 and 70 which are vertical and spaced apart adjacent to one another. The shafts are connected at the bottom region by a connector conduit 72. Sewage flows generally in the downward direction through shaft 68 and in the upward through shaft 70 which are maintained at a substantially constant sewage column height. Shaft 68 can be made much smaller diameter than shaft 70 if desired. The top of treatment shaft 70 is provided with a screen 74 and overflow outlet 76 for treated screened sewage. A disinfectant dispenser 78 is provided adjacent to conduit 62 to introduce disinfectant material into the waste stream in proportion to the volume of sewage entering the system. As in the previous embodiments, each of the shafts are provided with a sewage pump 80, 82 and 84 at the lower most point of the shaft in order to pump waste water along with any solids and floatables collected in the system back into the sewage collector 60.

The embodiment of system 56 illustrated in FIG. 4 like the sewage systems 10 and 32 of FIGS. 1 and 3 are capable of storing sewage in an untreated state and the storage, shaft or basin prior to entering the treatment shaft. However, it is possible to optionally introduce disinfectant into the storage shaft as well via optional supplemental disinfectant dispenser 78'. In the event that an extreme high flow rate excess water event is anticipated or if the flow rate of wastewater exceeds a preset level which is so high that insufficient contact time with the disinfectant would occur if introduced in the treatment shafts alone, adding disinfectant to storage shaft 34 would insure sufficient disinfectant contact. Once discharged wastewater flow rate drops to normal design flow rates, disinfectant maybe again be introduced at dispenser 78 only. If the wastewater flow continues at a normal level for some time after disinfectant is no longer introduced in the storage shaft 34 relatively little disinfectant will remain in the storage shaft 34 at the end of the rain event. Optional supplemental disinfectant dispensers could also be used in the FIGS. 1 and 3 embodiments described above to reduce disinfectant usage.

The present system and method enables sewage system operators to minimize the use of disinfectants while maintaining the highest quality of overflow discharge. Designing a municipal sewer system is always a series of compromises, trading off capacity, construction and operating costs. The present invention enables very large waste water basins to be fabricated at a reasonable cost while dramatically minimizing the amount of disinfectant needed.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for treating excess wastewater from a sewer system generated during a rain event sufficient to generate wastewater in excess to the sewer system's processing capacity, the method comprising:

receiving the excess wastewater from the sewer system into a first storage chamber, wherein the first storage chamber includes an upper end having an overflow outlet and a lower end having a return outlet;

allowing wastewater to overflow into a second storage chamber when the first storage chamber becomes full during a rain event, the second storage chamber being associated with a third storage chamber with each of the second and third storage chambers having an upper end and an interconnected lower ends, wherein the upper end of the second storage chamber having an inlet adapted to receive wastewater from the overflow outlet of the first storage chamber, the upper end of the third storage chamber having an effluent discharge outlet, and the lower end of at least one of the second and third storage chambers having a return out outlet;

injecting a treating agent into the wastewater that reaches the second chamber so as to disinfect any wastewater that reaches the effluent discharge outlet without treating the wastewater while in the first storage chamber; and upon completion of the rain event;

the wastewater in the first storage chamber, is first returned to the sewer system via a first sewage pump connected to the first storage chamber return outlet then wherein the first storage chamber is empty the wastewater in the second and third storage chambers is returned to the sewer system; and in the event of the reoccurrence of a second rain event sufficient to generate excess wastewater before the second and third storage chambers are pumped out, the excess wastewater can be initially received into the first storage chamber thereby conserving the use of additional treating agent.

2. The method of claim 1 wherein upon completion of the second rain event, wastewater in the first storage chamber is returned to the sewer system before any of the wastewater stored in the second and third storage chambers is returned.

3. The method of claim 1 wherein the wastewater in the first storage chamber is returned to the sewer system by the first sewage pump and the wastewater in the second and third storage chambers is returned to the sewer system by a second sewage pump.

* * * * *